US005312094A

United States Patent [19]

Zera

[11] Patent Number: 5,312,094

[45] Date of Patent: May 17, 1994

[54] VACUUM CLAMP

[76] Inventor: Robert D. Zera, 3101 Spruce La., Minnetonka, Minn. 55305

[21] Appl. No.: 7,262

[22] Filed: Jan. 21, 1993

[51] Int. Cl.[5] ........................ B25B 1/00; B25B 11/00; B23Q 3/08

[52] U.S. Cl. .......................................... 269/3; 269/21; 269/25; 269/237; 269/257

[58] Field of Search ............................ 24/463; 81/487; 294/1.2, 64.1; 269/25, 21, 237, 239, 268, 257, 3, 6

[56] References Cited

U.S. PATENT DOCUMENTS

| | | | |
|---|---|---|---|
| 254,741 | 3/1882 | Walsh | 269/25 |
| 1,033,492 | 7/1912 | Tedell | 269/25 |
| 1,075,064 | 10/1913 | Prime | 269/25 |
| 1,400,801 | 12/1921 | Cohen | 269/25 |
| 2,379,629 | 7/1945 | Eweson | 294/1.2 |
| 2,381,657 | 8/1945 | Eksergian et al. | 269/25 |
| 2,517,941 | 8/1950 | Stubbs | 269/25 |
| 2,552,304 | 5/1951 | Arter, Jr. . | |
| 2,656,820 | 10/1953 | Becker | 269/25 |
| 2,706,922 | 4/1955 | Allen . | |
| 2,849,907 | 9/1958 | Moosman | 269/25 |
| 2,914,977 | 12/1959 | Verderber | 269/25 |
| 2,947,275 | 8/1960 | Edmond . | |
| 3,424,486 | 1/1969 | Corley | 294/1.2 |
| 4,265,476 | 5/1981 | Elgart | 294/64.1 |

*Primary Examiner*—Robert C. Watson
*Attorney, Agent, or Firm*—Vidas, Arrett & Steinkraus

[57] ABSTRACT

A vacuum-operated clamp is provided, the clamp comprising a vacuum cylinder composed of a cylinder body, a cylinder piston having a piston rod and a resilient and sealing piston head or O-rings, a single pair of toothed jaws which are mounted on the piston rod and on the cylinder body, and a control valve mounted in the end of the cylinder body, whereby the stroke and the clamping force of the clamp may be controlled. The clamp body may be fabricated of plastic or metal. The clamp may further include a finger hole in one jaw in order to aid in operating the clamp. The vacuum-operated clamp disclosed requires no external source of vacuum.

11 Claims, 2 Drawing Sheets

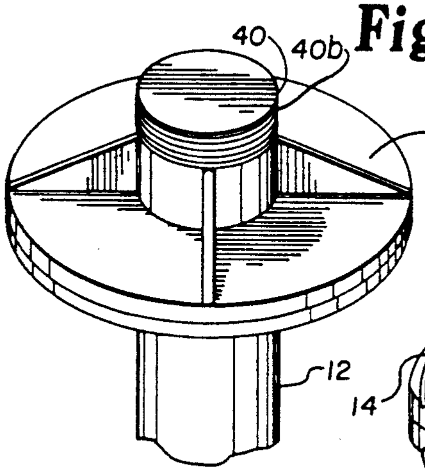
Fig.5
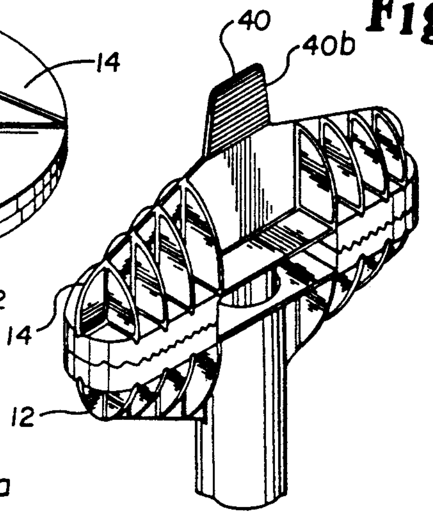
Fig.6
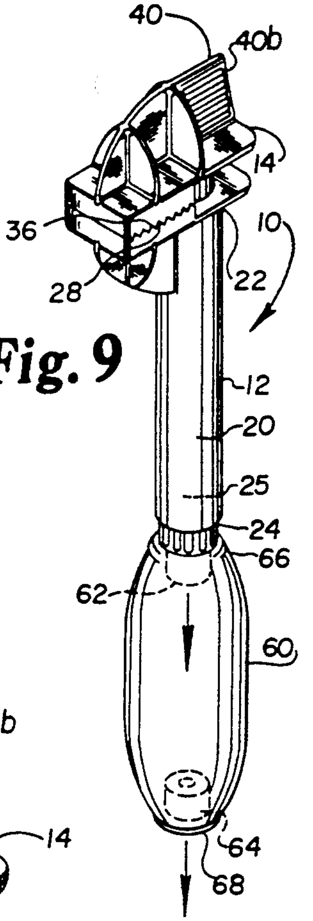
Fig. 9
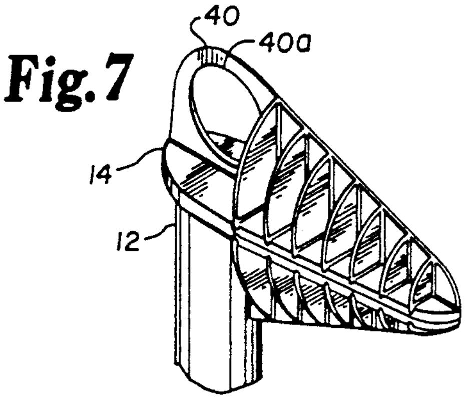
Fig.7
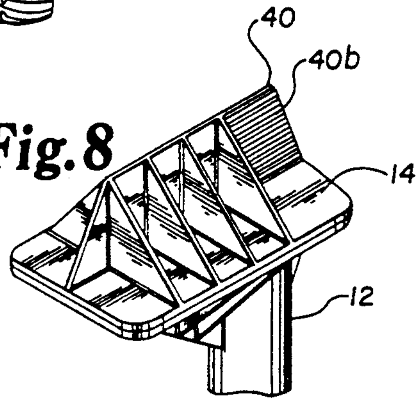
Fig.8
Fig.10
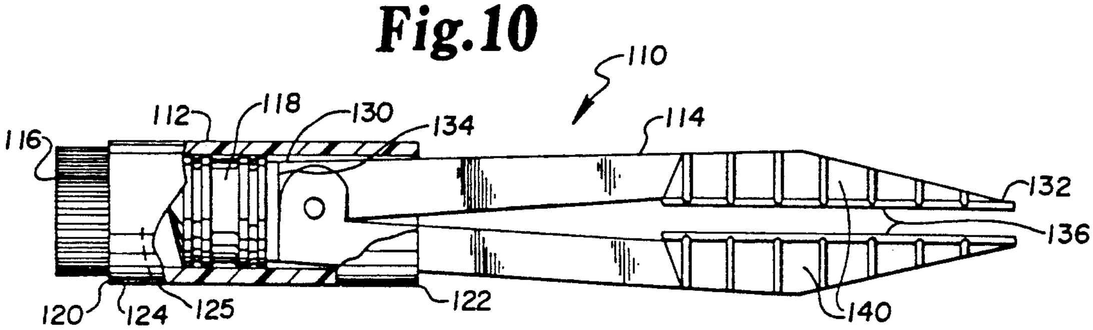

VACUUM CLAMP

BACKGROUND OF THE INVENTION

1. Field of the Invention

This invention relates generally to vacuum clamps and more particularly to a vacuum clamp employing a syringe, which is reliable and simple to use.

2. Description of the Related Art

Vacuum syringes with and without an external vacuum source are known in the art. U.S. Pat. No. 4,265,476 issued to Elgart on May 5, 1981 relates to a lighted work-holding device which has a piston and a piston rod inside a cylinder. The piston rod head has resilient O-ring seals. There is no control valve and no toothed jaws. There is no external vacuum source. The clamp is made of metal. The device of Elgart is simply a standard syringe in which the objects are picked up by suction at the aperture. The rest of the invention deals with a latch to keep the clamp as desired.

U.S. Pat. No. 2,947,275 issued to Edmonds on Aug. 2, 1960 relates to a pneumatic clamp with jaws attached to the cylinder body and to the cylinder rod. The jaws are not toothed, and they have no finger holes to aid in opening the jaws. There is external pneumatic power, and the clamp is made of metal.

U.S. Pat. No. 2,517,941 issued to Stubbs on Aug. 8, 1950, U.S. Pat. No. 2,552,304 issued to Arter, Jr. on May 8, 1951, U.S. Pat. No. 2,706,922 issued to Allen on Apr. 26, 1955 also disclose hydraulic clamps and wrenches.

Although metal cylinders with cylinder bodies, cylinder rods having O-ring pistons, with two toothless jaws fastened to the cylinder body and to the cylinder rod, and to control valves for pressure rather than vacuum are available, a need still exists for a vacuum-operated clamp which is reliable and simple to use.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. § 1.56(a) exists.

SUMMARY OF THE INVENTION

The invention provides a vacuum clamp comprising a vacuum cylinder composed of a cylinder body, a cylinder piston with a resilient and sealing piston head or O-rings, and a piston rod, a single pair of toothed jaws which are mounted on the piston rod and on the cylinder body, and a control valve, mounted in the end of the cylinder body, which controls the stroke and the clamping force of the clamp. The clamp body may be fabricated of plastic or metal; there is a finger hole in one jaw in order to aid in operating the clamp; and there is no external source of vacuum.

BRIEF DESCRIPTION OF THE DRAWINGS

A detailed description of the invention is hereafter described with specific reference being made to the drawings in which:

FIG. 5 is a perspective view of an alternative embodiment thereof;

FIG. 6 is a perspective view of an alternative embodiment thereof;

FIG. 7 is a perspective view of an alternative embodiment thereof;

FIG. 8 is a perspective view of an alternative embodiment thereof;

FIG. 9 is a perspective view of an alternative embodiment thereof; and

FIG. 10 is a fragmentary view of an alternative embodiment thereof.

DESCRIPTION OF THE PREFERRED EMBODIMENTS

The principle premise of the vacuum clamp is that a vacuum can be created in a sealed environment through the interconnection of several components. The pressure exerted by the interaction of the components can be used to create a device which can hold objects with varying degrees of pressure.

Figure 1:
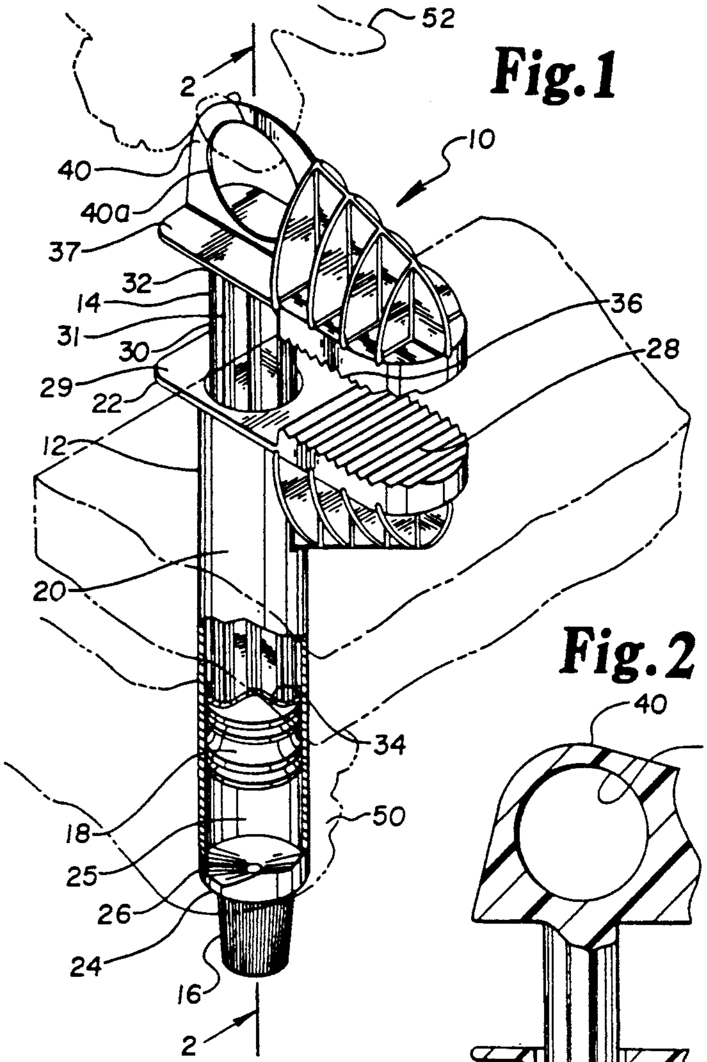
FIG. 1 is a perspective view of the invention.
Figure 3:
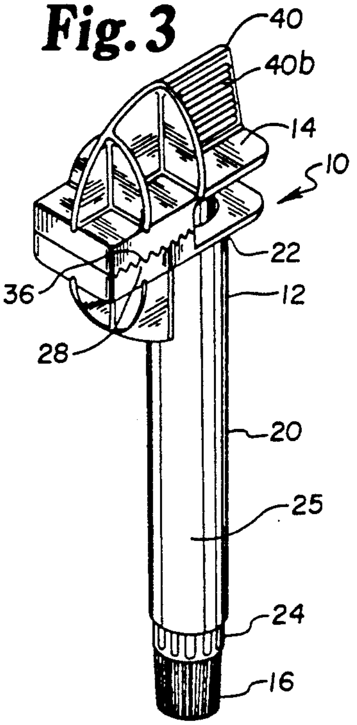
FIG. 3 is a perspective view of an alternate embodiment thereof.

Referring to FIG. 1, the vacuum clamp, referred to generally at 10, comprises a lower clamp body 12, an upper clamp body 14, a seal adjustment cap 16 and a clamp seal 18.

Lower clamp body 12 comprises a hollow cylinder 20 having proximal and distal ends 22,24. Interior 25 of hollow cylinder 20 may be of varying volumes, depending upon its intended use. Aperture 26 is located at distal end 24.

Lower clamping surface 28 is located at proximal end 22 of lower clamp body 12, extending upwardly from lower flange 29. Upper clamp body 14 comprises a vacuum plunger 30 comprising a plunger type shaft 31 having proximal and distal ends 32,34, with upper clamping surface 36 located at proximal end 32, extending downwardly from upper flange 37.

Clamp seal 18 is located at distal end 34 of upper clamp body 14. Clamp seal 18 seals the interior 25 of lower clamp body 12 of clamp 10. Clamp seal 18 may be made of any soft resilient material which seals the interior volume of the lower clamp body producing the vacuum, such as a piston head or O-rings.

Figure 2:
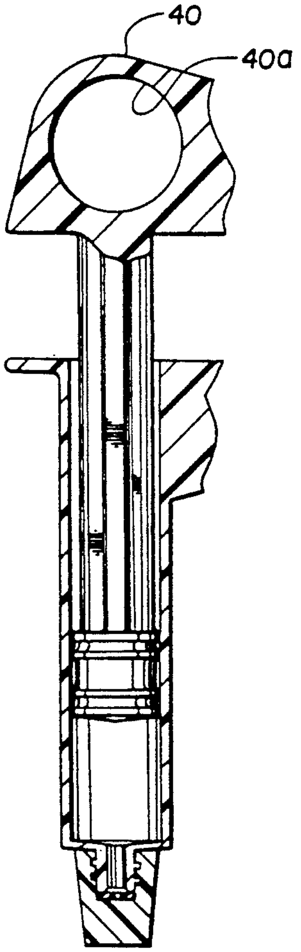
FIG. 2 is a sectional view thereof taken along line 2—2 in FIG. 1.

Lifting means 40 is located at proximal end 32 of upper clamp body 14, extending upwardly from upper flange and may be a finger loop **40*a*, as shown in FIGS. 1, 2 and 7 or a finger grip 40*b* as shown in FIGS. 3, 5, 6, 8 and 9**.

Seal adjustment cap 16 is a sealing device which, when attached to lower clamp body aperture 26, becomes an adjustment device for controlling the amount of pressure and the distance between clamping surfaces 28,36.

In operation, plunger 30 operates as the vacuum producing device. Plunger 30 is inserted into cylinder 20 of lower clamp body 12 until clamping surfaces 28,36 are tightly together. The clamping surfaces are shown in this position in FIG. 3.

Figure 4:
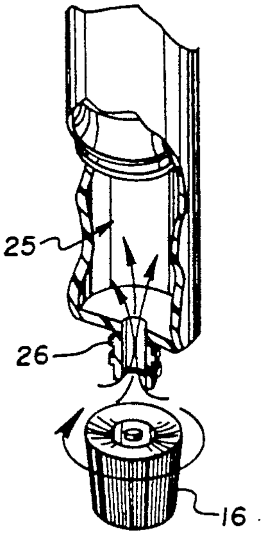
FIG. 4 is a fragmentary perspective view thereof.

As shown in FIG. 4, seal adjustment cap 16 is then attached to aperture 26 of cylinder 20. In the most preferred embodiment as shown in FIG. 4, aperture 26 and cap 16 are threaded, although the cap and aperture may be attached by snap-fitting, or the like.

As shown in FIG. 1, lower clamp body 12 is secured with one hand (shown in phantom at 50). Lifting means 40 is grasped by finger loop 40a (or finger grip 40b in an alternative embodiment) and plunger 30 is manually raised with the other hand (shown in phantom at 52), thereby creating a vacuum within cylinder 20. FIG. 2 also shows clamp 10 with plunger 30 in lifted position.

Clamp 10 is then positioned on a substrate or item to be held, shown at 54, with clamping surfaces 28, 36 facing upper and lower surfaces 56,58, respectively, of substrate 54. As gripping means 40 is released, the vacuum pulls clamping surfaces 28, 36 toward substrate 54, thereby attaching clamp 10 to substrate 54 and holding it in place. In the most preferred embodiment, clamping surfaces 28, 36 have ridges, which enhance their gripping properties.

If the pressure created by the vacuum is too great to permit the clamp 10 to be attached to substrate 54 without causing damage to substrate 54, the pressure can be adjusted by manipulating seal adjustment cap 16.

Alternative embodiments of the clamping means are shown in FIGS. 5-8. The embodiment in FIG. 5 depicts a donut shaped clamping surface. FIG. 6 depicts a clamping means with two pairs of clamping surfaces on either side of the plunger shaft. FIG. 7 shows a tapered clamping surface, and FIG. 9 shows a rectilinear shaped clamping surface. An infinite number of clamping surfaces may be provided, and may even be custom fit to a specific application.

In an alternative embodiment shown in FIG. 9, in which elements corresponding to those in FIG. 1 are given like numerals, the seal adjustment cap is replaced by a flexible bulb-type hand pump 60 having two one-way valves 62,64 located at its proximal and distal ends 66,68, respectively. This embodiment is attached to a substrate in the manner described above. After attachment to substrate 54, pump 60 is squeezed, causing valves 62,64 to evacuate the air inside cylinder 20, thereby maximizing the clamping force. A clamping surface of any shape may be used with this embodiment.

Another alternative embodiment is shown in FIG. 10. This alternative clamp, indicated generally at 110, provides a tweezer-like clamp comprising a lower clamp body 112, an upper clamp body 114, a seal adjustment cap 116 and a clamp seal 118.

Lower clamp body 112 comprises a hollow cylinder 120 having proximal and distal ends 122,124. Interior 125 of hollow cylinder 120 may be of varying volumes, depending upon its intended use. Aperture 126 (not shown, but may be seen at 26 in FIGS. 1 and 4)) is located at distal end 124.

Upper clamp body 114 comprises a vacuum plunger 130 having proximal and distal ends 132,134, with clamping surfaces 136 located near proximal end 132.

Clamp seal 118 is located at distal end 134 of upper clamp body 114. Clamp seal 118 seals the interior 125 of lower clamp body 112 of clamp 110. Clamp seal 118 may be made of any soft resilient material which seals the interior volume of the lower clamp body producing the vacuum.

Lifting means 140 is located near proximal end 132 of upper clamp body 114. Seal adjustment cap 116 is a sealing device which, when attached to lower clamp body aperture 126, becomes an adjustment device for controlling the amount of pressure and the distance between clamping surfaces 136.

In use, clamp 110 is attached to a substrate by grasping lifting means 140 and lifting upper clamp body 14, thereby creating a vacuum. As upper clamp body is lifted, hinge means 150 opens, allowing clamping surfaces 136 to separate. Clamping surfaces 136 are placed on either side of the substrate. Releasing the grip on the lifting means allows the upper clamp body to slide back into cylinder 120 of lower clamp body 112 in response to the vacuum. As the vacuum pulls plunger 130 toward distal end 124 of cylinder 120, hinge 150 closes, compressing clamping surfaces 136 together in the same manner as a tweezer. The substrate is thereby grasped and held between clamping surfaces 136. Clamp 110 may be released by removing seal adjustment cap 116. In addition, the hand operated pump as shown in FIG. 9 may be utilized with this embodiment.

Although not shown in the figures, an external vacuum pump could be attached to aperture 26 of all embodiments of the present invention by means of cap 16, allowing the vacuum to be pulled until cap 16 is tightened.

The vacuum clamps of the present invention have many advantages over prior vacuum clamps. By utilizing the principle of vacuum associated pressure, holding devices can be developed for applications in all areas. The clamp itself is material independent. Products utilizing this principle can be manufactured in all types of materials including plastics and metals, depending on end use.

The inventive vacuum clamp has many and varied uses, the most obvious being as a replacement for, or in conjunction with, any existing adjustable clamping device in use today for work holding, or as a secondary holding device for a primary product, i.e. a work light. The vacuum clamp has applicability anywhere holding is required.

The vacuum clamp of the present invention has potentially diverse applications and can be used in multiple industries, such as hardware, hobby, medical, construction and others. The clamp may be used, for example as a tool for home and hobby use, as a holding device for primary products such as illuminating holding products and home improvement products. The inventive vacuum clamp also has applicability as an industrial tool for use in heavy industry, in packaging for commercial uses, in construction, in various technological fields, or in the medical profession, where clamping and work holding is required.

In comparison to other holding devices, the vacuum clamp of the present invention also has many advantages of a general nature, including flexibility, ease of use, cost effectiveness, portability, multiple uses, expandability and ease of assembly.

One distinct advantage of the present invention is the simplicity of factory or consumer assembly. Further, a single vacuum clamp can be adjusted to fit multiple sizes of objects to be held. The vacuum clamp is quite simple to operate, requiring few instructions. The vacuum clamp is cost effective, being inexpensive to manufacture. Further, the clamp is compact and easy to transport. The clamp is versatile, as it can be used as a primary product or as a secondary holding device of another product. The vacuum clamp of the present invention is an all-purpose tool. A complete line of clamps for varied uses are available simply by adjusting the size of the cylinder body. The varied configurations of the clamping surface add to the clamp's versatility.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

This completes the description of the preferred and alternate embodiments of the invention. Those skilled in the art may recognize other equivalents to the specific embodiment described herein which equivalents are intended to be encompassed by the claims attached hereto.

What is claimed is:

1. A vacuum operated clamp comprising a) a vacuum cylinder comprising i) a cylinder body having a proximal end and a distal end, said distal end being closed:

ii) an aperture at the distal end of the cylinder body controlled by a control valve;

iii) a lower flange extending outwardly from the proximal end of the cylinder body, the lower flange having a top side and an underside;

iv) a cylinder piston having proximal and distal ends, and including an upper flange extending outwardly from its proximal end, the upper flange having a top side and an underside, said cylinder piston being constructed and arranged to sealingly mate with said cylinder body to thereby pull a vacuum when moved up out of said cylinder;

v) a gripping means extending outwardly from the top side of the upper flange, said gripping means comprising a finger loop; and b) a clamping means comprising an upper clamping surface and a lower clamping surface, the upper clamping surface being mounted on the proximal end of piston rod and a lower clamping surface being mounted on the proximal end of the cylinder body, the upper clamping surface extending downwardly from the underside of the upper flange and the lower clamping surface extending upwardly from the top side of the lower flange, such that the upper and lower clamping surfaces face each other.

2. A vacuum operated clamp comprising a) a vacuum cylinder comprising i) a cylinder body having a proximal end and a distal end, said distal end being closed:

ii) an aperture at the distal end of the cylinder body controlled by a control valve;

iii) a lower flange extending outwardly from the proximal end of the cylinder body, the lower flange having a top side and an underside;

iv) a cylinder piston having proximal and distal ends, and including an upper flange extending outwardly from its proximal end, the upper flange having a top side and an underside, said cylinder piston being constructed and arranged to sealingly mate with said cylinder body to thereby pull a vacuum when moved up out of said cylinder;

v) a gripping means extending outwardly from the top side of the upper flange, said gripping means having a ribbed gripping surface; and b) a clamping means comprising an upper clamping surface and a lower clamping surface, the upper clamping surface being mounted on the proximal end of piston rod and a lower clamping surface being mounted on the proximal end of the cylinder body, the upper clamping surface extending downwardly from the underside of the upper flange and the lower clamping surface extending upwardly from the top side of the lower flange, such that the upper and lower clamping surfaces face each other.

3. A vacuum operated clamp comprising a) a lower clamp body comprising a hollow cylinder with proximal and distal ends, and a lower flange with a top side and an underside extending outwardly from the proximal end of the lower clamp body;

b) an upper clamp body comprising a plunger shaft with proximal and distal ends, and an upper flange with a top side and an underside extending outwardly from the proximal end of the upper clamp body said upper plunger shaft being constructed and arranged to mate with said lower clamp body cylinder to create a vacuum;

c) a clamping means comprising an upper clamping surface extending downwardly from the underside of the upper flange and a lower clamping surface extending upwardly from top side of the lower flange, such that the upper and lower clamping surfaces face each other;

d) a control valve at the distal end of the cylinder body; and e) a hand-operated bulb-type pump having proximal and distal ends and two one-way valves located one at each end, the hand pump being adapted to seal the control valve;

whereby when the pump is squeezed by hand, air in the hollow cylinder is evacuated, causing the upper clamp body to be pulled distally within the hollow cylinder in response to the vacuum therein, thereby securing the clamping surfaces to an item placed between the clamping surfaces to be held.

4. A vacuum operated clamp comprising a) a lower clamp body comprising a hollow cylinder with proximal and distal ends, and a lower flange with a top side and an underside extending outwardly from the proximal end of the lower clamp body;

b) an upper clamp body comprising a plunger shaft with proximal and distal ends, and an upper flange with a top side and an underside extending outwardly from the proximal end of the upper clamp body said upper plunger shaft being constructed and arranged to mate with said lower clamp body cylinder to create a vacuum; and c) a clamping means comprising a donut shaped upper clamping surface extending downwardly from the underside of the upper flange and a donut shaped lower clamping surface extending upwardly from top side of the lower flange, such that the upper and lower clamping surfaces face each other.

5. A vacuum operated clamp comprising a) a lower clamp body comprising a hollow cylinder with proximal and distal ends, and a lower flange with a top side and an underside extending outwardly from the proximal end of the lower clamp body;

b) an upper clamp body comprising a plunger shaft with proximal and distal ends, and an upper flange with a top side and an underside extending outwardly from the proximal end of the upper clamp body said upper plunger shaft being constructed and arranged to mate with said lower clamp body cylinder to create a vacuum;

c) a clamping means comprising an upper clamping surface extending downwardly from the underside of the upper flange and a lower clamping surface extending upwardly from top side of the lower flange, such that the upper and lower clamping surfaces face each other; and d) a gripping means extending from the upper flange, the gripping means comprising a finger loop.

6. A vacuum operated clamp comprising a) a lower clamp body comprising a hollow cylinder with proximal and distal ends, and a lower flange with a top side and an underside extending outwardly from the proximal end of the lower clamp body;

b) an upper clamp body comprising a plunger shaft with proximal and distal ends, and an upper flange with a top side and an underside extending outwardly from the proximal end of the upper clamp body said upper plunger shaft being constructed and arranged to mate with said lower clamp body cylinder to create a vacuum;

c) a clamping means comprising an upper clamping surface extending downwardly from the underside of the upper flange and a lower clamping surface extending upwardly from top side of the lower flange, such that the upper and lower clamping surfaces face each other; and d) a gripping means extending from the upper flange, the gripping means having a ribbed gripping surface.

7. A vacuum operated clamp comprising a) a lower clamp body having proximal and distal ends, the lower clamp body comprising:

i) a hollow cylinder with proximal and distal ends;

ii) an aperture located at the distal end of the lower clamp body; and iii) a lower flange extending from the proximal end of the lower clamp body, the lower flange having a top side and an underside;

b) a sealing means adapted to seal the lower clamp body aperture, said sealing means comprising a hand-operated bulb-type pump having proximal and distal ends and two one-way valves located one at each end;

c) an upper clamp body with proximal and distal ends, the upper clamp body comprising:

i) a plunger shaft with proximal and distal ends and a plunger seal at its distal end;

ii) an upper flange extending from the proximal end of the upper clamp body, the upper flange having a top side and an underside;

d) a clamping means comprising:

i) a ridged upper clamping surface extending downwardly from the underside of the upper flange; and ii) a lower clamping surface extending upwardly from top side of the lower flange, such that the upper and lower clamping surfaces face each other; and e) a gripping means extending from the upper flange, whereby when the pump is squeezed by hand, air in the hollow cylinder is evacuated, causing the upper clamp body to be pulled distally within the hollow cylinder in response to the vacuum therein, thereby securing the clamping surfaces to an item placed between the clamping surfaces to be held.

8. A vacuum operated clamp comprising a) a lower clamp body having proximal and distal ends, the lower clamp body comprising:

i) a hollow cylinder with proximal and distal ends;

ii) an aperture located at the distal end of the lower clamp body; and iii) a lower flange extending from the proximal end of the lower clamp body, the lower flange having a top side and an underside;

b) a sealing means adapted to seal the lower clamp body aperture;

c) an upper clamp body with proximal and distal ends, the upper clamp body comprising:

i) a plunger shaft with proximal and distal ends and a plunger seal at its distal end;

ii) an upper flange extending from the proximal end of the upper clamp body, the upper flange having a top side and an underside;

d) a clamping means comprising:

i) a ridged upper clamping surface extending downwardly from the underside of the upper flange; and ii) a lower clamping surface extending upwardly from top side of the lower flange, such that the upper and lower clamping surfaces face each other; and e) a gripping means extending from the upper flange, said gripping means comprising a finger loop.

9. A vacuum operated clamp comprising a) a lower clamp body having proximal and distal ends, the lower clamp body comprising:

i) a hollow cylinder with proximal and distal ends;

ii) an aperture located at the distal end of the lower clamp body; and iii) a lower flange extending from the proximal end of the lower clamp body, the lower flange having a top side and an underside;

b) a sealing means adapted to seal the lower clamp body aperture;

c) an upper clamp body with proximal and distal ends, the upper clamp body comprising:

i) a plunger shaft with proximal and distal ends and a plunger seal at its distal end;

ii) an upper flange extending from the proximal end of the upper clamp body, the upper flange having a top side and an underside;

d) a clamping means comprising;

i) a ridged upper clamping surface extending downwardly from the underside of the upper flange; and ii) a lower clamping surface extending upwardly from top side of the lower flange, such that the upper and lower clamping surfaces face each other; and e) a gripping means extending from the upper flange, said gripping means having a ribbed gripping surface.

10. A vacuum operated clamp comprising a) a lower clamp body having proximal and distal ends, the lower clamp body comprising;

i) a hollow cylinder with proximal and distal ends;

ii) an aperture located at the distal end of the lower clamp body;

iii) a lower flange extending from the proximal end of the lower clamp body, the lower flange having a top side and an underside;

b) a sealing means adapted to seal the lower clamp body aperture;

c) an upper clamp body with proximal and distal ends, the upper clamp body comprising;

i) a plunger shaft with proximal and distal ends and a plunger seal at its distal end;

ii) an upper flange extending from the proximal end of the upper clamp body, the upper flange having a top side and an underside;

d) a clamping means comprising;

i) a ridged upper clamping surface extending downwardly from the underside of the upper flange, said clamping surface being donut shaped; and tp2 ii) a donut shaped lower clamping surface extending upwardly from top side of the lower flange, such that the upper and lower clamping surfaces face each other; and e) a gripping means extending from the upper flange.

11. A vacuum operated clamp comprising a) a lower clamp body having proximal and distal ends, the lower clamp body comprising;

i) a hollow cylinder with proximal and distal ends; and ii) an aperture located at the distal end of the lower clamp body;

b) a sealing means adapted to seal the lower clamp body aperture, said sealing means is a flexible bulb-type hand pump having proximal and distal ends and two one-way valves located one at each end;

c) an upper clamp body with proximal and distal ends, the upper clamp body comprising;

i) a plunger seal having proximal and distal ends, the plunger seal being located at the distal end of the upper clamp body; and ii) a tweezer-like clamping means having proximal and distal ends, its distal end being joined to the plunger seal at its proximal end, the clamping means comprising a base from which a hinged pair of clamping surfaces proximally extend such that the clamping surfaces meet when the upper clamp body is pulled into the lower clamp body cylinder by a vacuum.

* * * * *